(12) United States Patent
Hamkens

(10) Patent No.: US 9,421,706 B2
(45) Date of Patent: Aug. 23, 2016

(54) METHOD FOR PRODUCING AN OPTICAL LENS ELEMENT, PARTICULARLY A HEADLIGHT LENS FOR A MOTOR VEHICLE HEADLIGHT

(75) Inventor: Jan H. Hamkens, Berlin (DE)

(73) Assignee: DOCTER OPTICS GMBH, Neustadt an der Orla (DE)

( * ) Notice: Subject to any disclaimer, the term of this patent is extended or adjusted under 35 U.S.C. 154(b) by 1744 days.

(21) Appl. No.: 12/670,880

(22) PCT Filed: Jul. 12, 2008

(86) PCT No.: PCT/DE2008/001160
§ 371 (c)(1),
(2), (4) Date: Jan. 27, 2010

(87) PCT Pub. No.: WO2009/018798
PCT Pub. Date: Feb. 12, 2009

(65) Prior Publication Data
US 2010/0202154 A1 Aug. 12, 2010

(30) Foreign Application Priority Data

Aug. 7, 2007 (DE) .................. 10 2007 037 204

(51) Int. Cl.
*F21V 5/04* (2006.01)
*B29C 45/56* (2006.01)
(Continued)

(52) U.S. Cl.
CPC ............ *B29C 45/561* (2013.01); *B29C 43/021* (2013.01); *B29C 45/0055* (2013.01); *F21S 48/1258* (2013.01); *F21S 48/1283* (2013.01);
*B29C 2043/3444* (2013.01); *B29K 2995/0026* (2013.01); *B29L 2011/0016* (2013.01); *B29L 2031/30* (2013.01)

(58) Field of Classification Search
CPC .................. B29C 45/561; F21S 48/1283
USPC .................................... 362/520; 264/210.5
See application file for complete search history.

(56) References Cited

U.S. PATENT DOCUMENTS 4,442,061 A * 4/1984 Matsuda et al. .......... 264/328.7
5,141,677 A * 8/1992 Fogarty ....................... 264/1.36
(Continued)

FOREIGN PATENT DOCUMENTS

DE 1099964 B 8/1961
DE 3440652 A1 5/1986
(Continued)

OTHER PUBLICATIONS

English Translation of Holz et al. (German Publication 102005009556).*
(Continued)

*Primary Examiner* — Joseph L Williams
(74) *Attorney, Agent, or Firm* — Barnes & Thornburg LLP

(57) ABSTRACT

The invention relates to a method for producing an optical lens element (2), particularly for illumination purposes, particularly for producing a headlight lens (2) for a vehicle headlight, particularly for a motor vehicle headlight (1), wherein a blank (136) made of a transparent plastic is shaped in an injection molding tool (131, 132) by means of an injection molding method, and the blank (136) is subsequently pressed into the lens element (2) by means of a final shape mold (140, 141, 142), particularly in a polished manner.

15 Claims, 11 Drawing Sheets

Figure 1:
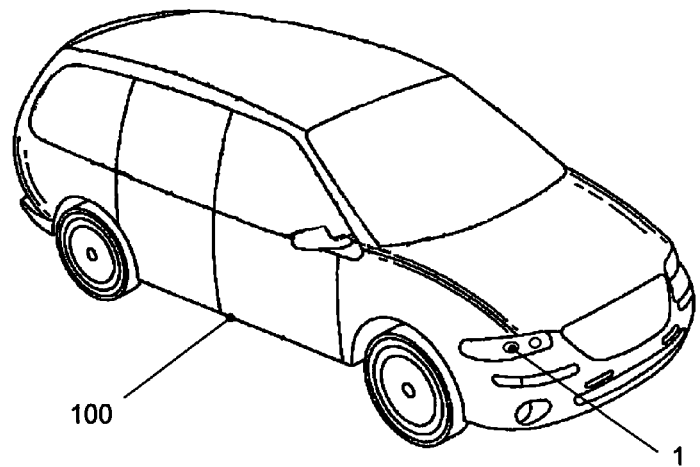

(51) Int. Cl.
    *B29C 43/02*     (2006.01)
    *B29C 45/00*     (2006.01)
    *F21S 8/10*     (2006.01)
    *B29C 43/34*     (2006.01)
    *B29L 11/00*     (2006.01)
    *B29L 31/30*     (2006.01)

(56) References Cited

U.S. PATENT DOCUMENTS

| | | |
|---|---|---|
| 6,130,777 A | 10/2000 | Yamashita et al. |
| 6,884,369 B2 | 4/2005 | Chiu et al. |
| 6,992,804 B2 | 1/2006 | Lamy et al. |
| 2003/0111747 A1 | 6/2003 | Chiu et al. |
| 2007/0027268 A1* | 2/2007 | Di et al. .................. 525/439 |
| 2009/0007599 A1 | 1/2009 | Muhle et al. |

FOREIGN PATENT DOCUMENTS

| | | |
|---|---|---|
| DE | 3906564 A1 | 10/1989 |
| DE | 4031352 A1 | 4/1992 |
| DE | 3602262 C2 | 5/1995 |
| DE | 29914114 U1 | 12/1999 |
| DE | 19829586 A1 | 1/2000 |
| DE | 10052653 A1 | 5/2002 |
| DE | 10118687 A1 | 10/2002 |
| DE | 102005009556 | 9/2005 |
| DE | 102005009556 A1 | 9/2005 |
| DE | 69923847 T2 | 1/2006 |
| DE | 202006005261 U1 | 7/2006 |
| DE | 10226471 B4 | 3/2007 |
| DE | 102006008938 A1 | 9/2007 |
| DE | 102006060141 * | 6/2008 |
| EP | 0144622 A1 | 6/1985 |
| EP | 01584863 A2 | 10/2005 |
| JP | 01 147403 | 6/1989 |
| JP | 5177725 | 7/1993 |
| JP | 268089 | 10/1995 |
| JP | 07268089 | 10/1995 |
| JP | 09 159810 | 6/1997 |
| JP | 10 1233070 | 5/1998 |
| JP | 10146852 | 6/1998 |
| JP | 10278062 | 10/1998 |
| JP | 2001019446 | 1/2001 |
| JP | 2002307504 | 10/2002 |
| JP | 2003165132 | 6/2003 |
| JP | 2005511367 | 4/2005 |
| WO | WO 02 31543 A1 | 4/2002 |
| WO | WO 03 074251 A1 | 9/2003 |
| WO | WO 2007 025637 A1 | 3/2007 |

OTHER PUBLICATIONS

PCT International Search Report for PCT/DE2008/001160 completed by the EP Searching Authority on Jan. 27, 2009.

Japanese Official Action dated Jun. 21, 2011, relating to Japanese Application No. 2010-519333.

\* cited by examiner

METHOD FOR PRODUCING AN OPTICAL LENS ELEMENT, PARTICULARLY A HEADLIGHT LENS FOR A MOTOR VEHICLE HEADLIGHT

CROSS-REFERENCE TO RELATED APPLICATIONS

This application is a U.S. national counterpart application of international application serial No. PCT/DE2008/001160 filed Jul. 12, 2008, which claims priority to German Patent Application No. 102007037204.5 filed Aug. 7, 2007.

The invention relates to a process for manufacturing an optical lens element, in particular for illumination purposes, particularly for manufacturing a headlight lens for a vehicle headlight, in particular for a motor vehicle headlight.

DE 699 23 847 T2 discloses a process for manufacturing an optical mould body from thermoplastic resin by injection pressure moulding, wherein the volume of a mould cavity expands more strongly than the volume of the optical mould body in question, and wherein molten thermoplastic resin is injected into the mould cavity through an injection moulding passage. In the expanded mould cavity, the material is subsequently pressed to a predetermined thickness of the medial area of the mould body or to a thickness which is by up to 200 µm smaller than the predetermined thickness. After pressing of the material in the expanded cavity, the pressure of the resin in the injection moulding passage and the moulding pressure in the mould cavity are changed within such boundaries that the width of change does not exceed ±100 µm of the predetermined thickness of a medial area of the mould body in order to be able to obtain the predetermined thickness of the finished mould body. Subsequently, the molten thermoplastic resin is retained within the mould cavity for sufficient time until the mould body in question has been formed. Thereafter, the thus obtained mould body is removed from the mould cavity.

According to DE 699 23 847 T2, a method for manufacturing an optical mould body from thermoplastic resin by injection pressure moulding as described in U.S. Pat. No. 4,540,534, EP 0 640 460 and JP 9-057794 has to be distinguished there from, which method comprises
  expanding the volume of a mould cavity beyond the volume of the optical mould body in question,
  injection moulding of molten thermoplastic resin in(to) the mould cavity through an injection moulding cylinder,
  pressing the expanded cavity to a predetermined thickness of the mould body,
  returning a surplus of the thermoplastic resin which has occurred by the moulding step, into the injection moulding cylinder,
  leaving the molten thermoplastic resin in the mould cavity until the mould body in question has been shaped, and
  removing the obtained mould body from the mould cavity.

DE 102 20 671 A1 discloses a plastic lens consisting of a collective lens of plastic material having a high Abbé number, and a dispersion lens connected therewith integrally and in positive fit of plastic material having a comparably low Abbé number regarding the plastic material of the collective lens, wherein the thermal expansion coefficients of the plastic materials are essentially the same.

Headlight lenses are known e.g. from WO 02/31543 A1, U.S. Pat. No. 6,992,804 B2, WO 03/074251 A1 and DE 100 52 653 A1. Further vehicle headlights are known e.g. from DE 100 33 766 A1, EP 0 272 646 A1, DE 101 18 687 A1 and DE 198 29 586 A1.

It is the object of the present invention to reduce the costs for manufacturing lens elements, in particular for illumination purposes, particularly for the manufacturing of headlight lenses for vehicle headlights. In this context it is particularly desirable to manufacture especially high-quality and high-value lens elements, in particular headlight lenses. It is a further object of the invention to manufacture specifically high-quality and high-value lens elements, in particular headlight lenses. It is a further object of the invention to reduce the weight of headlight lenses for motor vehicle headlights as well as the weight of motor vehicle headlights.

The aforementioned objects are achieved by a process for manufacturing an optical lens element, in particular for illumination purposes, particularly for manufacturing a headlight lens for a vehicle headlight, particularly for a motor vehicle headlight, wherein a blank is moulded from transparent, in particular thermoplastic, particularly essentially liquid plastic, especially by means of an injection-press process in an injection-pressing mould, and wherein the blank is subsequently pressed by means of a final shape/contour mould to form the lens element, in particular press moulded. Herein, the blank is particularly moulded such that it has essentially the same mass as the lens element.

A lens element in the sense of the invention is particularly a headlight lens. A lens element in the sense of the invention is particularly a headlight lens for imaging a light-dark-borderline on a roadway. A lens element in the sense of the invention is particularly a single lens, but it may well also be an optical structure in the sense of PCT/EP2006/007820. A lens element in the sense of the invention may also be a transparent mould element in the sense of PCT/EP2006/007820.

In an advantageous embodiment of the invention, the blank may be cooled and heated again or may be removed from the injection-pressing mould and subsequently cooled and heated again. Herein, the temperature gradient of the blank is expediently reversed. Thus, the core of the blank, when removed from the injection-pressing mould, may be warmer than the outer region of the blank. After the heating, however, the outer region of the blank is advantageously warmer than the core of the blank. According to a further expedient embodiment of the invention, the gradient of the preform may be set such that the temperature of the core of the preform will lie clearly above room temperature. In a further advantageous embodiment of the invention, the temperature gradient of the preform may be set such that the temperature of the core of the preform will lie at least 100° C. above room temperature.

According to a further advantageous embodiment of the invention, the blank may be manufactured by means of an injection-pressing process with an integrally moulded sprue. In a yet further advantageous embodiment of the invention, the blank may be held hanging on the sprue when being cooled and/or heated. In a further expedient embodiment of the invention, the blank may not be touched during cooling and/or during heating. In a yet further expedient embodiment of the invention, the blank, when being cooled and/or heated, may not be touched on a surface provided as an optically operative face. In a yet further expedient embodiment of the invention, the blank is not being touched on a surface provided as an optically operative face, with the exception of during pressing. In a further advantageous embodiment of the invention, the blank is not being touched on a surface provided as an optically operative surface before pressing. In a yet further advantageous embodiment of the invention, the blank is not being touched on a surface provided as an optically operative surface between the injection-pressing and the pressing.

In a further advantageous embodiment of the invention, a light dispersing surface structure may be embossed, by means of the final shape/contour mould, into an optically operative surface of the lens element. An appropriate light dispersing surface structure may e.g. comprise a modulation and/or a (surface) roughness of at least 0.05 µm, in particular at least 0.08 µm, or it may be designed as a modulation, if necessary having a (surface) roughness of at least 0.05 µm, in particular at least 0.08 µm.

Roughness in the sense of the invention is to be defined particularly as Ra, in particular according to ISO 4287. In a furthermore advantageous embodiment of the invention, the light dispersing surface structure may comprise a structure simulating the surface of a golf ball, or it may be designed as a structure imitating a golf ball surface. Appropriate surface structures dispersing light have e.g. been disclosed in DE 10 2005 009 556, DE 102 26 471 B4 and DE 299 14 114 U1. Further embodiments of surface structures dispersing light have been disclosed in German Letters Patent 1 009 964, DE 36 02 262 C2, DE 40 31 352 A1, U.S. Pat. No. 6,130,777, US 2001/0033726 A1, JP 10123307 A, JP 09159810A, and JP 01147403A.

The aforementioned object is (also) solved by a batch, in particular 10, advantageously 100, particularly according to a method according to one of the preceding claims, of subsequently produced headlight lenses for vehicle headlights, in particular for motor vehicle headlights, for imaging an edge of a shield of a vehicle headlight as a light-dark-borderline having a determined gradient, wherein each headlight lens is essentially made from transparent plastic, and wherein the standard deviation of the gradients of the headlight lenses of the batch is smaller than or equal to 0.005,
the standard deviation of the glare (value) of the headlight lenses of the batch or the headlights into which the headlight lenses of the batch are to be installed is smaller than or equal to 0.05 lux and/or
the standard deviation of the 75R-value of the headlight lenses of the batch or of the headlight lenses into which the headlight lenses of the batch are to be installed is smaller or equal to 0.5 lux.

Further advantages and details may be taken from the following description of examples of embodiment. Therein, it is shown in FIG. 1 an example of embodiment of a motor vehicle, FIG. 2 a schematic representation of an exemplary vehicle headlight, FIG. 3 and exemplary illumination or light distribution of the headlight according to FIG. 2, FIG. 4 a cross-section through an example of embodiment of a headlight lens for a vehicle headlight according to FIG. 2, FIG. 5 a cut-out of the cross-section according to FIG. 4, FIG. 6 an example of embodiment of a modulation of an optically operative surface of the headlight lens according to FIG. 2, FIG. 7 an alternative example of embodiment of a headlight lens, FIG. 8 a further alternative example of embodiment of a headlight lens, FIG. 9 a further alternative example of embodiment of a headlight lens, FIG. 10 a further alternative example of embodiment of a headlight lens, FIG. 11 an example of embodiment of a process for manufacturing a headlight lens according to FIG. 4, FIG. 12 an example of embodiment of an injection pressing mould by way of a principle representation, FIG. 13 an example of embodiment of a mould for the final shape by way of a principle representation, and FIG. 14 an example of embodiment of a transport container.

Figure 2:
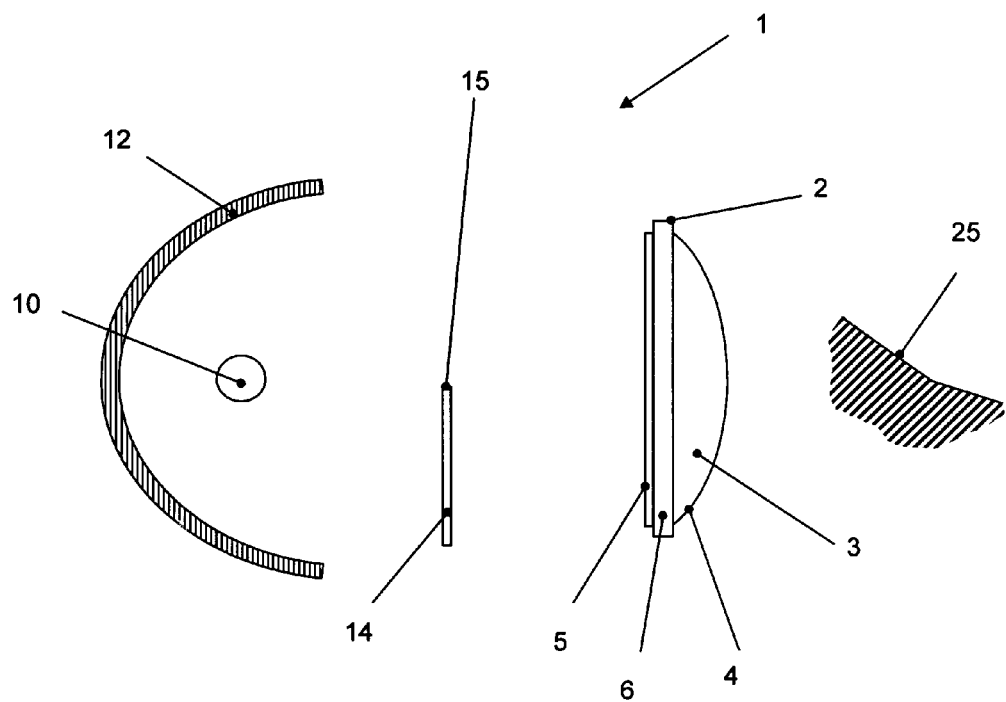
Figure 3:
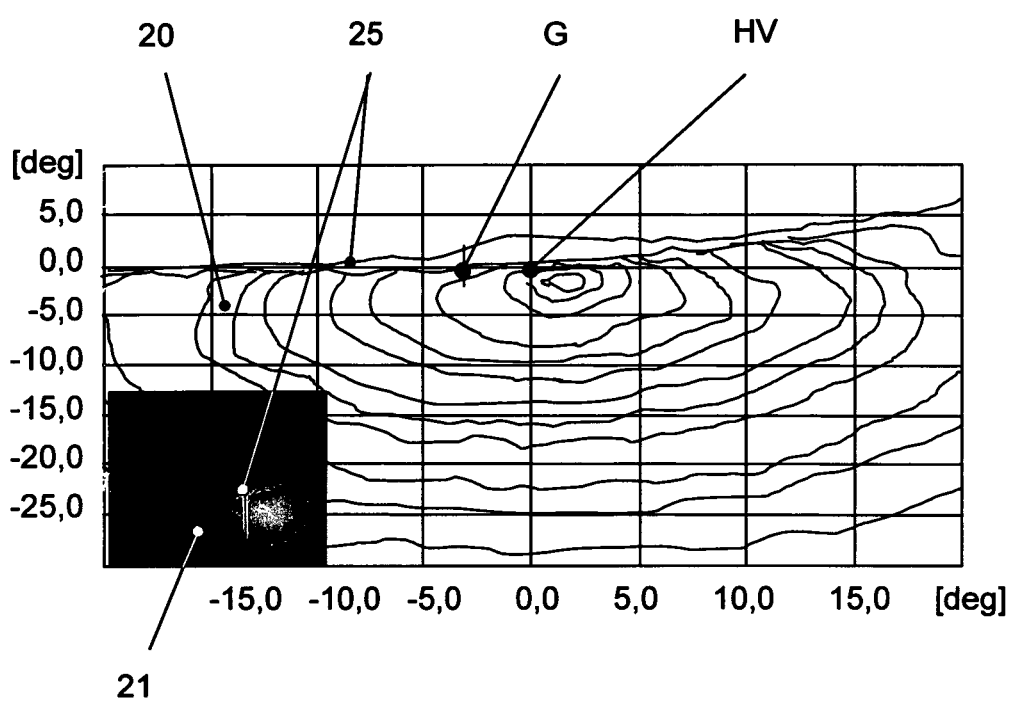

FIG. 1 shows a vehicle 100 having a vehicle headlight 1 schematically depicted in FIG. 2 including a light source 10 for generating light, a reflector 12 for reflecting light generated by means of the light source 10, and a shield 14. The vehicle headlight 1 moreover comprises an integral headlight lens 2 blank-moulded (bright-pressed) on both sides for changing the beam direction of light to be generated by means of the light source 10, and in particular for imaging an edge of the shield 14, which edge has been denominated by reference numeral 15 in FIG. 2, as a light-dark-borderline 25, as has been represented, by way of example, in FIG. 3 in a diagram 20 and in a photograph 21. Herein, the gradient G of the light-dark-borderline 25 and the glare (value) HV of the vehicle headlight 1 into which the headlight lens 2 has been installed, are important photometric guide values.

The headlight lens 2 comprises a lens body 3 made of transparent material, in particular glass, which body comprises an essentially planar optically effective/operative surface 5 facing the light source 10 and a convexly curved optically effective/operative surface 4 turned or facing away from the light source 10. The headlight lens 2 moreover optionally comprises an edge or rim 6, by means of which the headlight lens 2 can be attached within the vehicle headlight 1.

Figure 4:
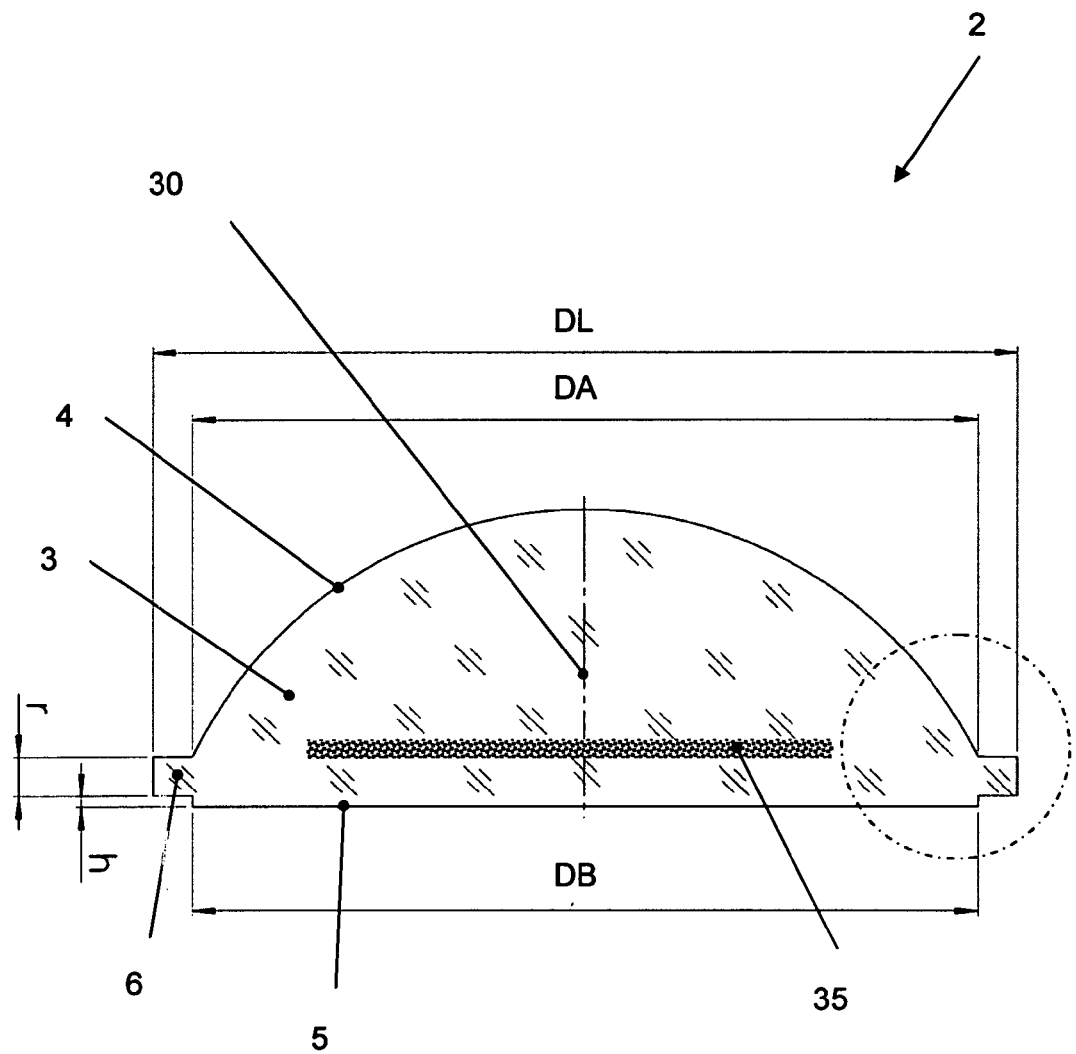
Figure 5:
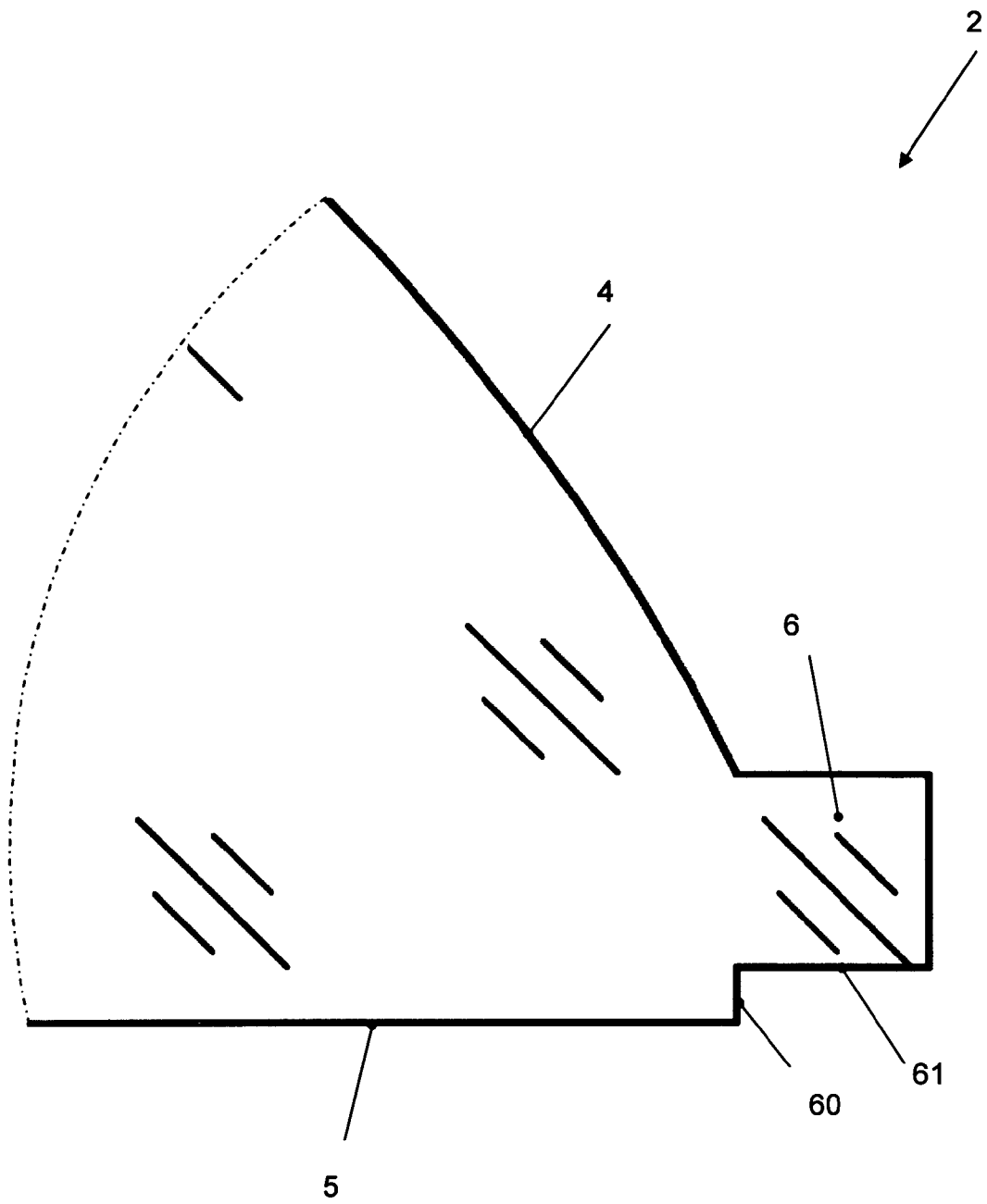

FIG. 4 shows a cross-section through an example of embodiment of the headlight lens 2 for the vehicle headlight 1 according to FIG. 2. FIG. 5 shows a cut-out of the headlight lens 2, which cut-out has been marked by means of a dash-dotted circle in FIG. 4. The essentially planar optically operative surface 5 projects, shaped as a cascade or step 60 and extending in the direction of the optical axis 30 of the headlight lens 2, beyond the lens edge 6 or beyond the surface 61 of the lens edge 6 facing the light source 10, wherein the height h of step 60 is no more than 1 mm, advantageously no more than 0.5 mm. The effective value of height h of step 60 is expediently 0.2 mm.

The thickness r of the lens edge 6 is at least 2 mm but not more than 5 mm. The diameter DL of the headlight lens 2 is at least 40 mm but not more than 100 mm. The diameter DB of the essentially planar optically operative surface 5 equals the diameter DA of the convexly curved optically operative surface 4. In a expedient embodiment, the diameter DB of the essentially planar optically operative surface 5 is no more than 110% of the diameter DA of the convexly curved optically operative surface 4. Moreover, the diameter DB of the essentially planar optically operative surface 5 is advantageously at least 90% of the diameter DA of the convexly curved optically operative surface 4. The diameter DL of the headlight lens 2 is advantageously approximately 5 mm larger than diameter DB of the essentially planar optically operative surface 5 or than the diameter DA of the convexly curved optically operative surface 4.

In the interior of the transparent body 3 the headlight lens 2 has a structure 35 dispersing light. The light dispersing structure 35 is advantageously a structure generated by means of a laser. Herein, it comprises advantageously a number of punctiform defects which are aligned with respect to a plane which is orthogonal with respect to the optical axis 30. It may be provided that the dispersing structure 35 be designed to be ring-shaped or comprises annular regions or that the punctiform defects are arranged in the manner rings. It may be provided that the punctiform defects are distributed at random, in particular within the selected structure.

For example, appropriate methods for generating the light dispersing structure 35 in the interior of the transparent body 3 may be taken from SU 1838163 A3, SU 1818307 A1, from the article "Optical applications of laser-induced gratings in Eu-doped glasses", Edward G. Behrens, Richard C. Powell, Douglas H. Blackburn, 10 Apr. 1990/Vol. 29, No. 11/APPLIED OPTICS, from the article "Relationship between laser-induced gratings and vibrational properties of Eu-doped glasses", Frederic M. Durville, Edward G. Behrens, Richard C. Powell, 35, 4109, 1987, The American Physical Society, from the article "Laser-induced refractive-index gratings in Eu-doped glasses", Frederic M. Durville, Edward G. Behrens, Richard C. Powell, 34, 4213, 1986, The American Physical Society, from the article "Interior Treatment of Glass by Means of Nd: YAG-Laser" ("Innenbearbeitung von Glas mit Nd: YAG-Laser"), Klaus Dickmann, Elena Dik, Laser Magazin, as well as from the state of the art cited in U.S. Pat. No. 6,992,804 B2.

In an alternative embodiment of the headlight lens 2, there may be provided that (instead of the edge 6) the lens comprises a projecting edge (projecting rearwardly or in the direction of the side facing the light source), as has e.g. been disclosed in WO/03/087893 A1, DE 203 20 546 U1, EP 1 495 347 A1, DE 102 16 706 A1, EP 1645545, and DE 10 2004 048 500 A1.

Figure 6:
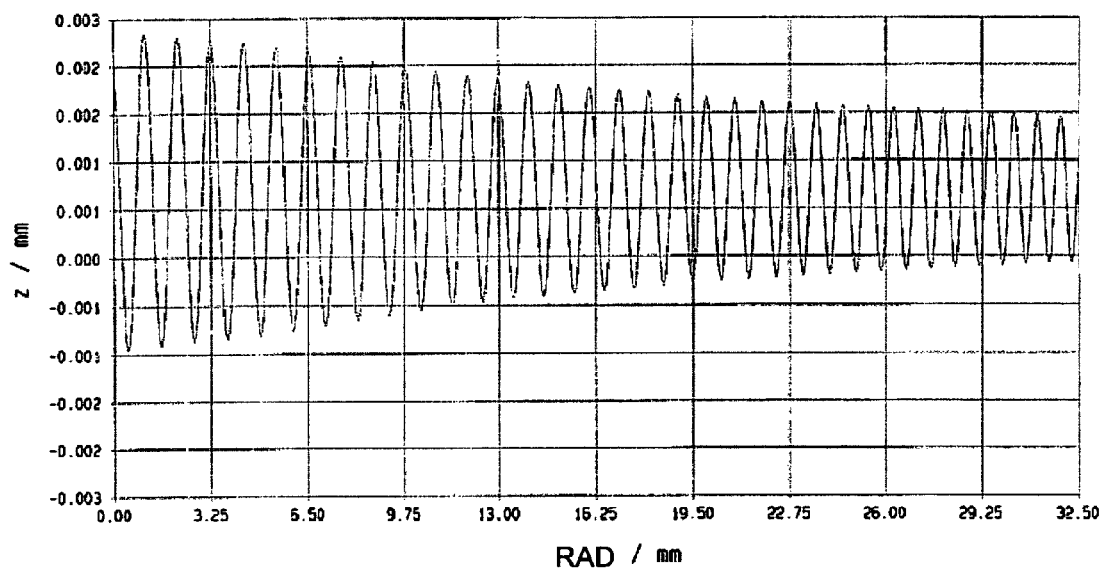

FIG. 6 shows as example of embodiment of a modulation of an optically operative surface 4 of the headlight lens 2. Herein, RAD designates the radial distance along the optically operative surface 4 from the point of penetration of the optical axis 30 through the optically operative surface 4. Reference sign z designates the modulation. Herein, it is provided that the amplitude of modulation z follows a fading-out envelope.

Figure 7:
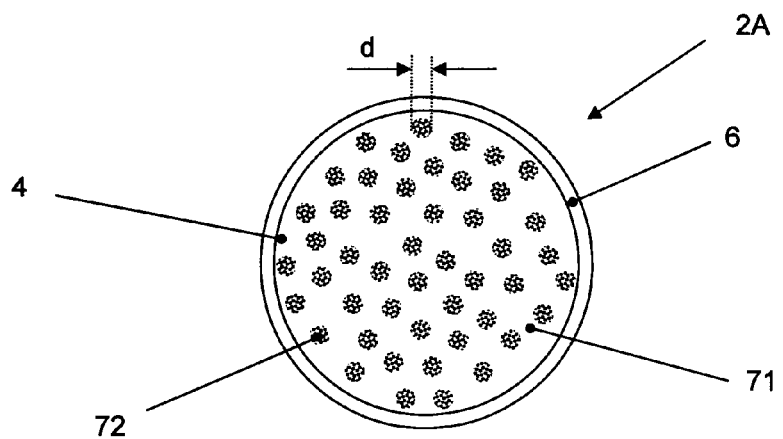

FIG. 7 shows an alternative example of embodiment of a headlight lens 2A for use instead of the headlight lens 2. Therein, several essentially circle-shaped areas 72 having a diameter d of between 0.5 mm and 10 mm and a (surface) roughness of at least 0.05 µm, in particular at least 0.08 µm, are arranged on the optically operative surface 4 facing away from the light source 10. In the present example of embodiment, the essentially circular areas 72 have a roughness of 0.6 µm. Reference numeral 71 designates the portion of the optically operative surface 4 facing away from the light source 10, which portion is not covered by the essentially circular areas 72. The surface of this portion is blank/bright, i.e. it has a roughness of approximately less than 0.04 µm. It may, however, also be provided that this portion is not blank/bright but has a roughness which differs from the roughness of the essentially circular areas 72. The essentially circular areas 72 cover 5% to 50% of the optically operative surface 4 facing away from the light source 10.

Figure 8:
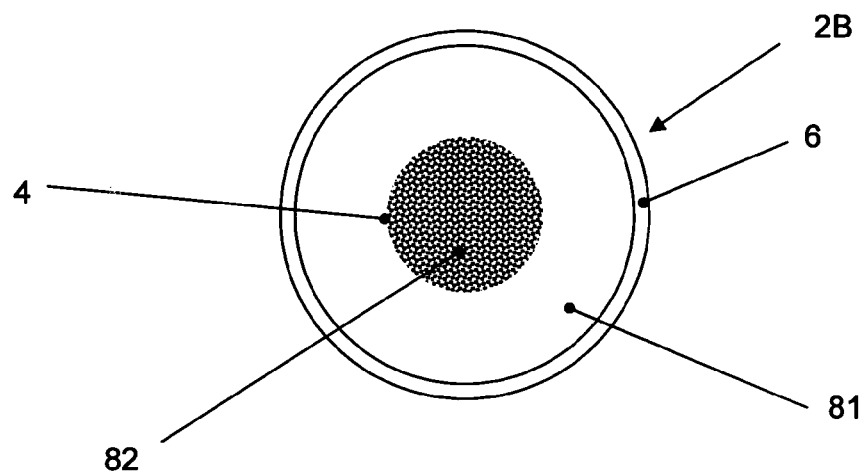

FIG. 8 shows a further alternative example of embodiment of a headlight lens 2B for use instead of the headlight lens 2. Therein, an essentially circular surface 82 having a (surface) roughness of at least 0.05 µm, in particular at least 0.08 µm, is arranged on the optically operative surface 4 facing away from the light source 10. In the present example of embodiment, the essentially circular surface 82 has a roughness of 0.2 µm. Reference numeral 81 designates such part of the optically operative surface 4 facing away from the light source 10 which is not covered by the essentially circular surface 82. The surface of this part is blank, i.e. it has a roughness of approximately less than 0.04 µm. It may, however, also be provided that this portion is not blank but has a roughness which differs from the roughness of the essentially circular surface 82. The essentially circular surface 82 covers at least 5% of the optically operative surface 4 facing away from the light source 10.

Figure 9:
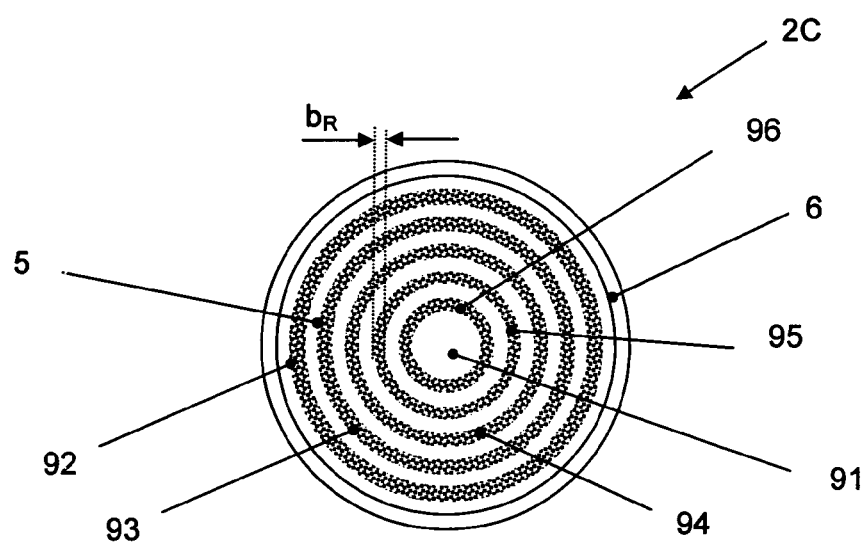

FIG. 9 shows a further alternative example of embodiment of a headlight lens 2C for use instead of the headlight lens 2. Therein, several essentially ring-shaped areas 92, 93, 94, 95, 96 arranged within each other and having a ring width $b_R$ of between 1 mm and 4 mm and a (surface) roughness of at least 0.05 µm, in particular at least 0.08 µm, are arranged on the essentially planar surface 5 facing the light source 10. In the present example of embodiment, the essentially ring-shaped areas 92, 93, 94, 95, 96 have a roughness of 0.1 µm. Reference numeral 91 designates such portion of the essentially planar surface 5 facing the light source 10 which is not covered by the essentially ring-shaped areas 92, 93, 94, 95, 96. The surface of this portion is blank, i.e. it has a roughness of approximately less than 0.04 µm. It may, however, also be provided that this portion is not blank but has a roughness which differs from the roughness of the essentially circular areas 22. The essentially ring-shaped areas 92, 93, 94, 95, 96 cover 20% to 70% of the essentially planar surface 5 facing the light source 10.

Figure 10:
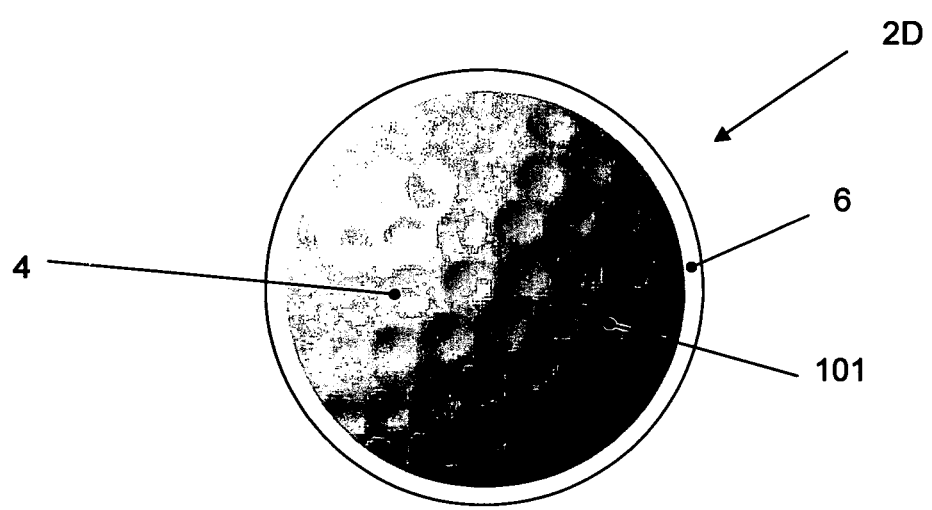

FIG. 10 shows a further alternative example of embodiment of a headlight lens 2D for use instead of the headlight lens 2. Herein, the optically operative surface 4 facing away from the light source 10 has a surface structure 101 simulating the surface of a golf ball. A similar surface structure may also be generated by a modulation z represented in FIG. 6, which is superimposed by a modulation extending orthogonally thereof (i.e. on a (concentric) circle around the optical axis 30).

Figure 11:
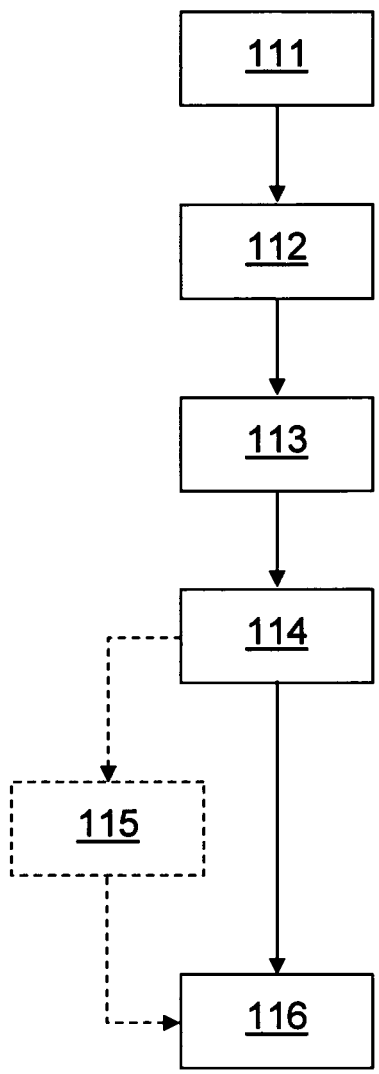

FIG. 11 shows a process for manufacturing the headlight lens 2 or one of the headlight lenses 2A, 2B, 2C, or 2D. Herein, transparent thermal plastic material is produced or liquefied in a step 111. The transparent thermoplastic plastic material is in particular a thermoplastic resin such as e.g. a polycarbonate resin, a polyacrylic resin or a modified polyolefin resin. Examples for appropriate thermoplastic plastic material or thermoplastic resin may be taken, in particular, from DE 699 23 847 T2. As a polycarbonate resin, DE 699 23 847 T2 consequently discloses the appropriate use of aromatic polycarbonate resin which has been obtained by processing a diphenol and a carbonate precursor. In this context, examples for the diphenol include bis-(hydroxylaryl)-alkanes such as 2,2-bis-(4-hydroxyphenyl)-propane (so-called bisphenol A), bis-(4-hydroxyphenyl)-methane, 1,1-bis-(4-hydroxyphenyl)-ethane, 2,2-bis-(4-hydroxyphenyl)-butane, 2,2-bis-(4-hydroxyphenyl)-octane, 2,2-bis-(4-hydroxyphenyl)-phenyl methane, 2,2-bis-(4-hydroxy-3-methylphenyl)-propane, 1,1-bis-(4-hydroxy-3-tert-butylphenyl)-propane, 2,2-bis-(4-hydroxy-3-bromophenyl)-propane, 2,2-bis-(4-hydroxy-3,5-dibromophenyl)-propane and 2,2-bis-(4-hydroxy-3,5-dichlorophenyl)-propane; bis-(hydroxyphenyl)-cycloalkane such as 1,1-bis-(hydroxyphenyl)-cyclopentane and 1,1-bis-(hydroxyphenyl)-cyclohexane; dihydroxyarylethers such as 4,4'-dihydroxydiphenylether and 4,4'-dihydroxy-3,3'-dimethyldiphenylether; dihydrodiarylsulfides such as 4,4'-dihydroxydiphenylsulfide and 4,4'-dihydroxy-3,3'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy-3,3'-dimethyldiphenylsulfone. These diphenols may be used per se or by way of a combination of two or more products.

Figure 12:
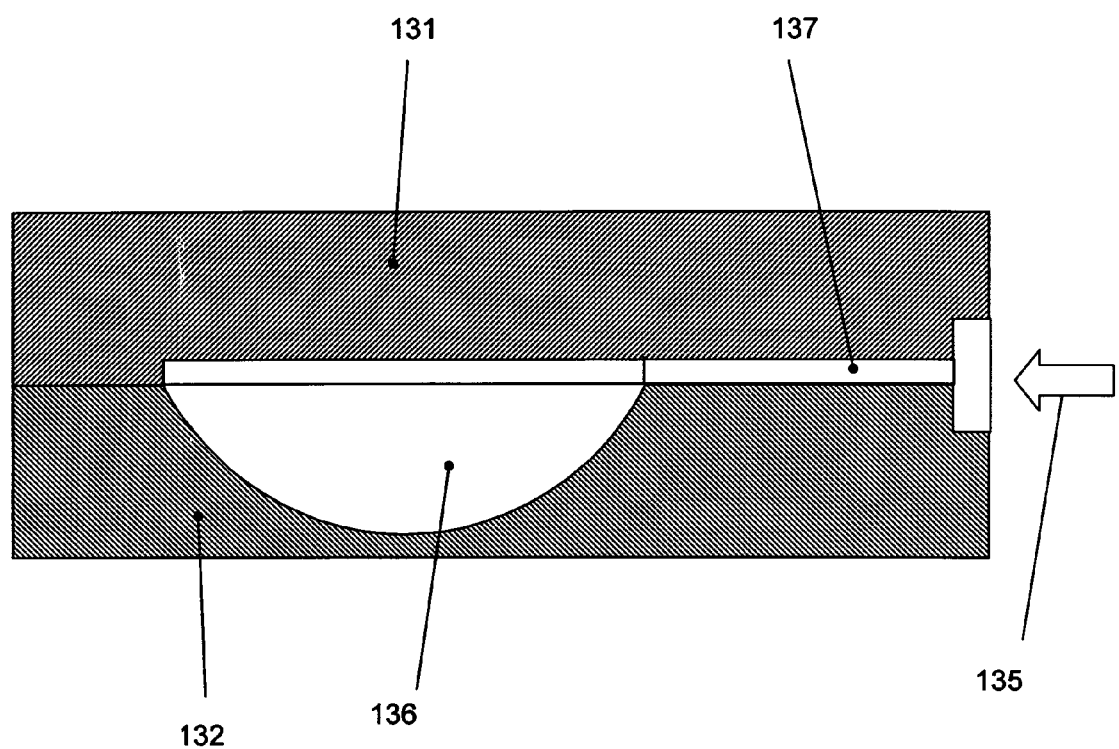

Step 111 is followed by a step 112 in which—as has been represented in FIG. 12—a blank 136 is moulded from the transparent plastic material by means of an injection pressure process in an injection pressing mould. The injection pressing mould represented by way of a principle representation in FIG. 12 comprises a mould section 131 and a mould section 132. The essentially liquid transparent plastic material is pressed into the injection pressing mould as has been depicted by arrow 135 such that the blank 136 is formed with a sprue 137. By opening the mould sections 131 and 132, the blank 136 may be removed by means of the sprue 137.

A step 113 follows, in which the blank 136 is tempered and/or cooled off. In tempering, the blank 136 is first cooled and subsequently heated, so that its gradient of temperature is reverted, which means that before tempering the core of the blank 136 is warmer than the outer region of the blank 136 and that after tempering the outer region of the blank 136 is warmer than the core of the blank 136. During cooling and/or tempering, the blank is advantageously held by the sprue 137 or hung up by means thereof. It may also be provided that the blank is positioned to stand by means of the sprue 137 during the cooling and/or the tempering.

Figure 13:
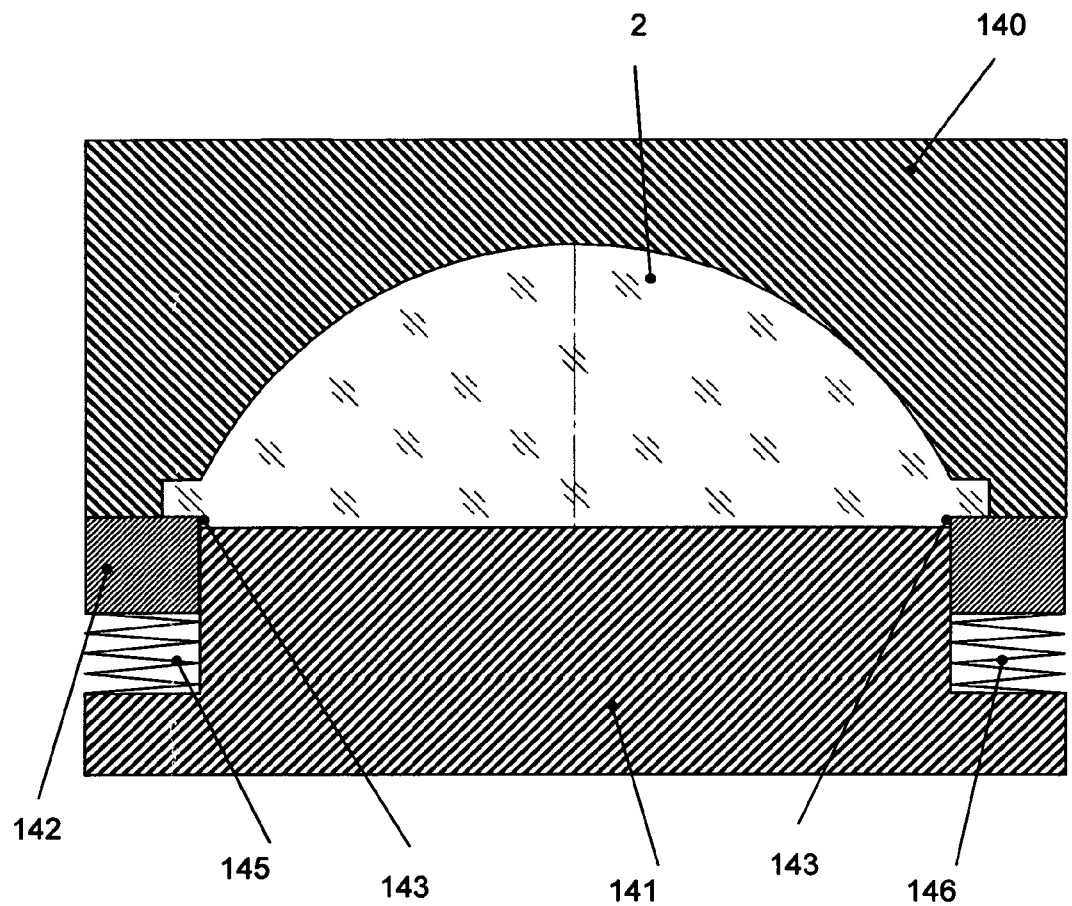

A step 114 follows in which the pre-form 136 is (blank)-moulded (or [bright-]pressed)—by means of a final-shape mould represented in FIG. 13—between a first mould 140 and a second mould, the latter comprising a first mould section 141 and a second mould section 142 which is annular and encloses the first mould section 141, to form a headlight lens 2 having an integrally moulded lens edge or rim 6, and wherein, by means of an offset 143 between the first mould section 141 and the second mould section 142 depending on the volume of the preform, the cascade or step 60 is pressed into the headlight lens 2. Herein, the pressing is, in particular, not performed in vacuum or under significant low-pressure. The pressing particularly occurs under air-pressure (atmospheric pressure). The first mould section 141 and the second mould section 142 are non-positively coupled together by means of springs 145 and 146. Herein, the pressing is performed such that the distance between the first mould section 141 and the first mould 140 is dependent on the volume of the pre-form or of the headlight lens 2 pressed from it, and the distance between the second mould section 142 and the first mould 140 is independent of the volume of the pre-form or of the headlight lens 2 pressed from it. After the pressing, the headlight lens 2 is cooled off and, if necessary, the essentially planar surface 5 is polished.

The final shape (or contour) mould may be designed as a horizontal pressing mould turned by 90°, as well.

Optionally, step 114 may be followed by step 115 in which the gradient of a headlight lens is measured and a structure corresponding to the light dispersing structure 35 is introduced into this or another headlight lens depending on the measured value of the gradient.

Figure 14:
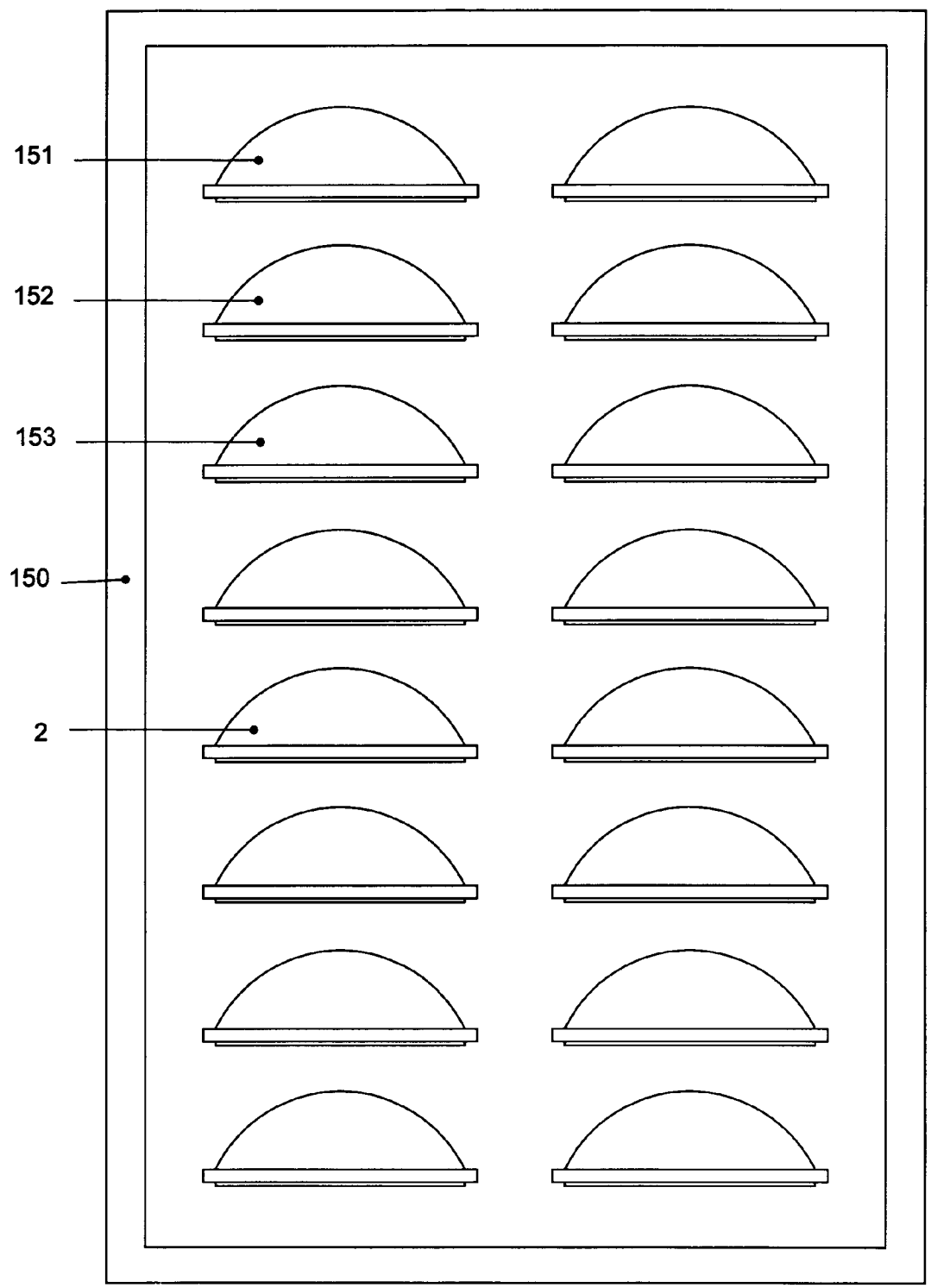

In a step 116 following step 114 or step 115, the headlight lens 2 is packaged into a transport container 150 represented in FIG. 14. for transporting headlight lenses together with further headlight lenses 151, 152, 153 designed corresponding to headlight lens 2. In the transport container 150, the headlight lenses 2, 151, 152, 153 form a batch, or rather a batch in the sense of the claims. In the transport container 50, the height of one step of a headlight lens 151 differs by more than 0.05 mm, advantageously by more than 0.1 mm, from the height of a step of a further headlight lens 153.

The standard deviation of the gradient of the headlight lenses 2, 151, 152, 153 in the transport container 150 is smaller than or equal to 0.005. The standard deviation of the glare of the batch of headlight lenses 2, 151, 152, 153 or of the vehicle headlights into which the headlight lenses 2, 151, 152, 153 have been installed is advantageously smaller than or equal to 0.05 lux. In a yet further advantageous embodiment, there is provided that the standard deviation of the value 75R of the headlight lenses 2, 151, 152, 153 or of the vehicle headlight into which the headlight lenses 2, 151, 152, 153 have been installed is smaller than or equal to 0.5 lux.

The procedure having been described with reference to a single lens may also be used for optical structures in the sense of PCT/EP2006/007820.

The elements in the figures have been drawn in consideration of simplicity and clearness and not necessarily to scale. Thus, for example, the order of magnitude of some elements has been exaggerated with respect to other elements in order to improve comprehension of the example of embodiment of the present invention.

The invention claimed is:

1. Method for manufacturing a batch of headlight lenses for imaging an edge of a shield of a vehicle headlight as a light-dark-borderline having a defined gradient, the method comprising;
   moulding a blank from transparent plastic material by means of an injection-pressing method in an injection-pressing mould,
   subsequently blank-moulding the blank by means of a final-shape mould to form a headlight lens, and
   consecutively repeating the previous steps such that the standard deviation of the gradients of the headlight lenses of the batch is smaller than or equal to 0.005.

2. Method as claimed in claim 1, wherein the batch comprises 10 consecutively produced headlight lenses.

3. Method as claimed in claim 1, wherein the batch comprises 100 consecutively produced headlight lenses.

4. Method as claimed in claim 1, wherein the transparent plastic material is thermoplastic plastic material.

5. Method as claimed in claim 1, wherein the blank is produced by means of the injection-pressing method from essentially liquid plastic material.

6. Method for manufacturing a headlight lens for imaging an edge of a shield of a vehicle headlight as a light-dark-borderline, the method comprising;
   moulding a blank from transparent plastic material by means of an injection-pressing method in an injection-pressing mould, and
   press-moulding the blank by means of a final contour mould to form the headlight lens for imaging an edge of a shield of a vehicle headlight as a light-dark-borderline.

7. Method as claimed in claim 6, wherein the transparent plastic material is thermoplastic plastic material.

8. Method as claimed in claim 6, wherein the blank is produced by means of the injection-pressing method from essentially liquid plastic material.

9. Method as claimed in claim 6, wherein, by means of the injection-pressing process, the blank is produced with an integral sprue.

10. Method as claimed in claim 6, wherein the blank is cooled and heated again.

11. Method as claimed in claim 6, wherein the blank is removed from the injection-pressing mould and subsequently cooled and heated again.

12. Method as claimed in claim 6, wherein by means of the final-shape mould a light dispersing surface structure is embossed into an optically operative surface of the headlight lens.

13. Batch of headlight lenses produced consecutively for imaging an edge of a shield of a vehicle headlight as a light-dark-borderline having a defined gradient, wherein each headlight lens is made of at least essentially transparent plastic material, and wherein the standard deviation of the gradients of the headlight lenses of the batch is smaller than or equal to 0.005.

14. Batch as claimed in claim 13 comprising 10 consecutively produced headlight lenses.

15. Batch as claimed in claim 13 comprising 100 consecutively produced headlight lenses.

* * * * *